United States Patent [19]

Lee

[11] Patent Number: 5,762,305
[45] Date of Patent: Jun. 9, 1998

[54] SUCKER STRUCTURE WITH A RIM HAVING STEMS EXTENDING TO A BROKEN RING

[76] Inventor: Mong-yu Lee, No. 182, Chienfeng Rd., Kangshan Chen, Kaohsiung Hsien, Taiwan

[21] Appl. No.: 718,919

[22] Filed: Sep. 25, 1996

[51] Int. Cl.⁶ .................................. A45D 42/14; B60J 3/00
[52] U.S. Cl. ........................ 248/205.8; 248/205.5; 248/206.2
[58] Field of Search ................... 248/205.8, 206.2, 248/205.5, 363, 362, 467; 160/DIG. 3, DIG. 13, 370.21, 368.1; 296/97.7

[56] References Cited

U.S. PATENT DOCUMENTS

| | | | |
|---|---|---|---|
| 1,518,943 | 12/1924 | Story | 160/DIG. 13 X |
| 2,736,375 | 2/1956 | Rupert | 160/370.21 X |
| 3,338,293 | 8/1967 | Hohmann | 160/370.21 |
| 3,879,005 | 4/1975 | Flick | 248/205.8 X |
| 4,846,429 | 7/1989 | Scheurer et al. | 248/205.8 |
| 5,020,754 | 6/1991 | Davis et al. | 248/205.8 X |
| 5,253,393 | 10/1993 | Levin | 248/205.5 X |
| 5,390,837 | 2/1995 | Ruffolo, Jr. | 248/206.2 X |
| 5,405,112 | 4/1995 | Trethewey | 248/205.8 |
| 5,611,511 | 3/1997 | Lee | 248/205.8 |

Primary Examiner—Robert W. Gibson, Jr.
Assistant Examiner—Stephen S. Wentsler
Attorney, Agent, or Firm—Thomas, Kayden, Horstemeyer & Risley

[57] ABSTRACT

A sucker structure including a body (50), a pair of stems (60), each of the stems having a first end (62) for connecting to the body (50) and a second end (64), and a ring-like piece (70), which is open ended and has two opposite ends (72) separated from each other and being connected to the stem (60) respectively. When a user pulls the ring (70) of the sucker to remove it from a surface, the force applied by the user becomes concentrated on at least one edge portion (52) of the body of the sucker via at least one stem (60), since the stems are separated from each other. Therefore, the user can easily remove the sucker from the surface by applying only a little force without concern about the angle at which the force is to be applied.

6 Claims, 4 Drawing Sheets

SUCKER STRUCTURE WITH A RIM HAVING STEMS EXTENDING TO A BROKEN RING

BACKGROUND OF THE INVENTION

1. Field of the Invention

The present invention relates to an improved sucker structure, more particularly, to a sucker having specific structure which can be easily removed from a surface it attaches to, so as to change the location of the sucker as desired, thereby attaining the effect for convenient use.

2. Description of Related Art

Suckers have been used widely in daily life. A sucker is generally used to hold some light-weight objects. For instance, a sucker is often combined with a hook to hang some objects and is attached on a surface, such as a window, a wall and the like, by means of the suction force thereof. The sucker, for example, can hold the sun-shade and be attached on the window of a vehicle. The sucker is also used on the point of a toy arrow for the sake of safety. The sucker can be formed into various types of shapes for different uses.

When a sucker is pressed to be attached to a surface, the air between a body of the sucker and the surface is expelled, thus the air pressure inside a space enclosed by the body and the surface is smaller than the external air pressure, thereby the sucker can be pressed to be securely attached to the surface by pressing of the external air pressure.

However, it is very difficult to remove the sucker from a surface once it has been securely attached to the surface since it is difficult to find the proper position and proper angle to apply force. If a user pulls a sucker attached to a surface to try to remove it without applying force on a proper position, it will take a lot of exertion to release the suction force of the sucker. In the worse case, the sucker, which is made of soft plastics, might be damaged by improper pulling, and this causes inconvenience for the user.

For example, in the case where a sucker is used to hold a sun-shade and is attached to the window of a vehicle, the difficulty in removing the sucker from the window results in great inconvenience for the driver if he wants to change the location of the sun-shade when driving. This will be described more detail later.

Now refer to FIG. 7, which shows a conventional sucker for holding a sun-shade to support it on a window of a vehicle. In FIG. 7, a sucker 30 has a body 31, a neck portion 32 with its one end integrally formed thereto, and a ring 34 is extended through a through-hole 33 defined in the neck portion 32. When the sucker 30 is combined with a sun-shade 40, the neck portion 32 without the ring 34 is firstly penetrated through an aperture 41 of the sun-shade 40, and then the ring 34 is extended into the through hole 33 of the neck portion 32. After the combination is completed, the sun-shade 40 can be held on the window of a vehicle by the sucker 30 with its body 31 having been pressed to suck on the window. However, the direction of sunlight may change for the driver as the vehicle is traveling so the driver often needs to move the sun-shade in order to put it at a proper position for shielding the driver from sunlight. If the driver wants to move the sun-shade 40 by removing the sucker 30 from the window, he needs to push the sun-shade aside with one hand, and pull a link 311 provided on the edge of the body 31 with the other hand to cause a gap to be generated between the body 31 and the window to let air go into the space between the body 31 and the window, and then the pressure inside said space and the external air pressure are equilibrated, thereby the sucker 30 can be removed. In this case, the driver has to use both his hands to move the sun-shade in the manner as mentioned above, which is very inconvenient and dangerous for the driver. Therefore, the need for a sucker which is easily removable from a surface exists.

SUMMARY OF THE INVENTION

One object of the present invention is to provide an improved sucker structure, which can be easily removed from a surface to which it is attached.

Another object of the present invention is to provide an improved sucker structure, which can eliminate the limit to angle for applying force when it is pulled to be removed from the surface to which it is attached.

In accordance with one aspect of the present invention, the sucker comprises a body, a pair of stems, each of the stems having a first end connected to said body and a second end, and a ring-like piece, which is open-ended and has two oppositely separate ends being connected to the pair of stems, respectively.

By utilizing the sucker structure of the present invention, a user can reduce his exertion while pulling the sucker to remove it from the surface since the stems are separated from each other, so the force applied to the sucker can be led to concentrate to a proper position via the proper stem, and therefore the user can easily remove the sucker from the surface without concerning about the angle for applying force.

Other objects, advantages and novel features of the invention will become more apparent from the following detailed description when taken in conjunction with the accompanying drawings.

DETAILED DESCRIPTION OF PREFERRED EMBODIMENT

Figure 1:
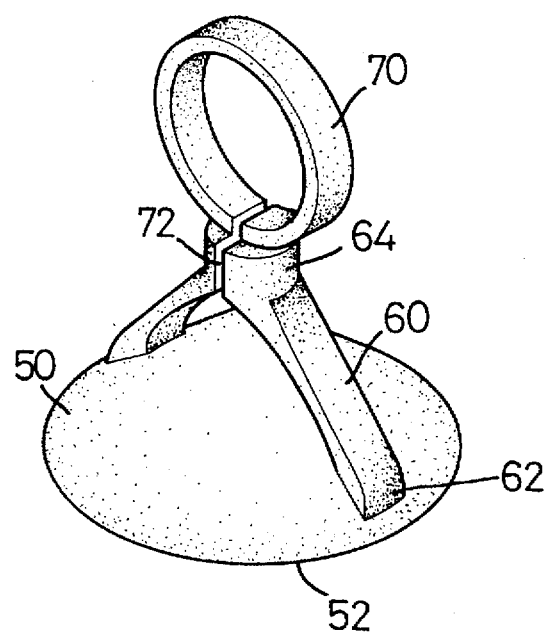
FIG. 1 is a perspective view of a sucker in accordance with an embodiment of the present invention.

Referring to FIG. 1, the sucker structure of the present invention comprises a body 50, a pair of stems 60 each having a first end 62 being connected to an edge 52 of said body 50 and a second end 64, and a ring-like piece 70, which is open-ended and has two opposite ends 72 separated from each other and being connected to said second ends 64 of said stems, respectively.

Figure 2:
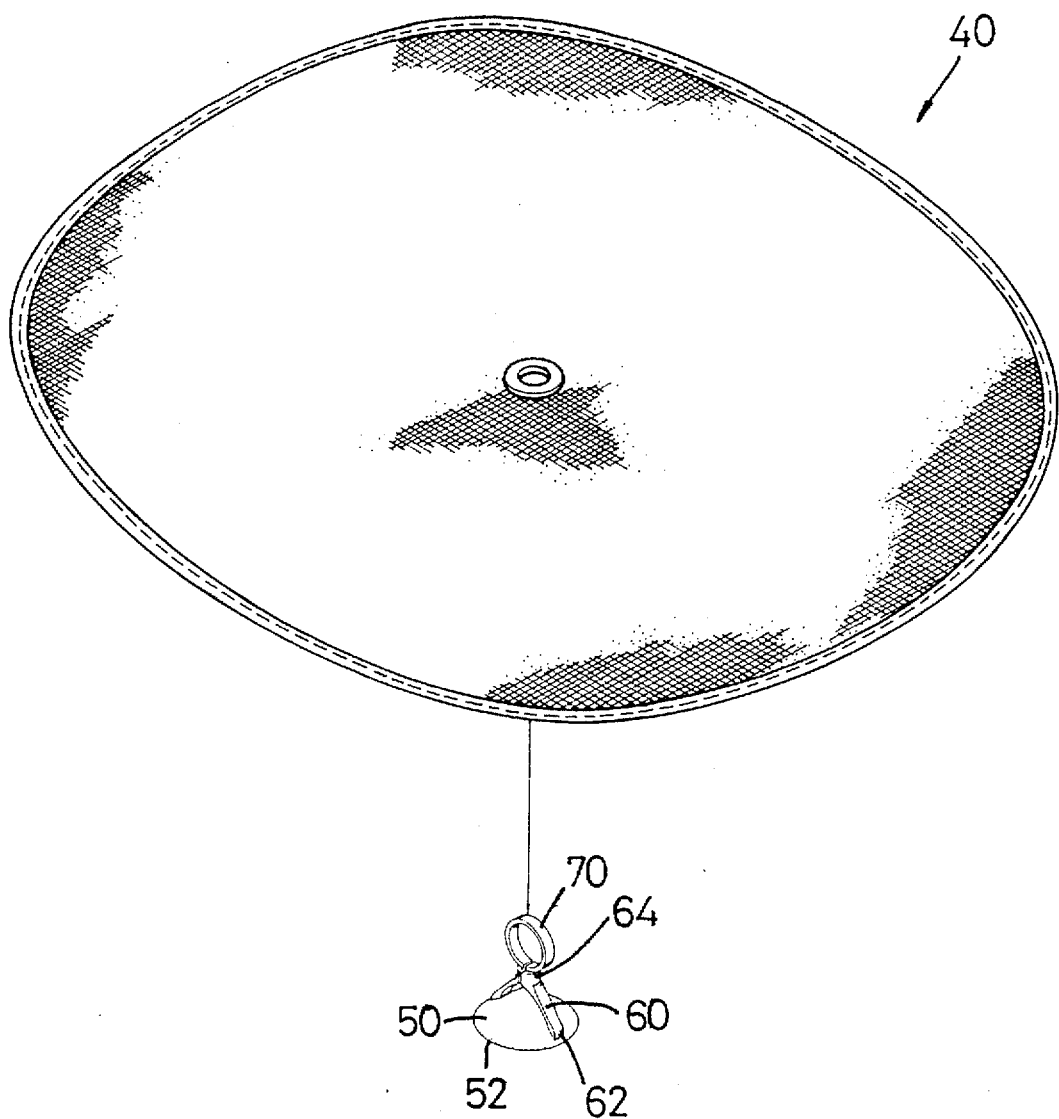
FIG. 2 is a diagram showing the sucker of FIG. 1 and a sun-shade for a vehicle.

In the utilization of the sucker, referring to FIG. 2, the sucker can be combined with a sun-shade 40 or the like and attaches to a plane surface such as a window. When the user wants to remove the sucker from the surface, he can pull the ring-like piece 70 in a direction away from the body 50 without paying attention to the angle for applying his force, and then the force applied to said ring-like piece 70 can propagate through the appropriate end 72 of the ring-like piece 70 and the corresponding stem 60 to concentrate to the portion of the body 50 connected with the first end 62 of said corresponding stem 60 to raise a part of the edge 52 of the body 50. Accordingly, the sucker can be removed from the surface easily.

Figure 3:
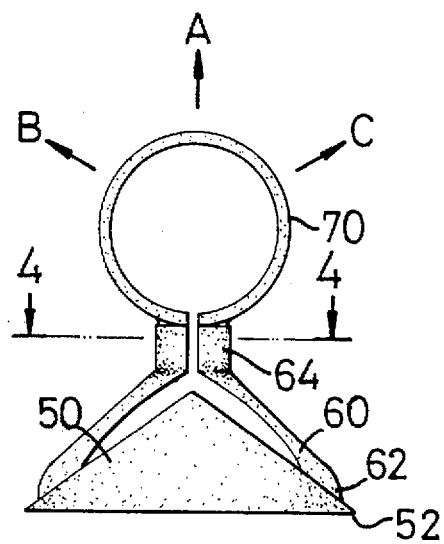
FIG. 3 is a diagram showing the sucker of the present invention being pulled in different directions.

For example, see FIG. 3, if the user pulls the ring-like piece 70 of the sucker in the direction indicated by "B", then the pulled ring-like piece 70 linkingly draws the stem 60 connected with the end 72 of the ring-like piece 70 at the same side with the direction "B", and accordingly raises the corresponding portion of the edge 52 of the body 50 connected with the first end 62 of the drawn stem 60, therefore a breach is generated between the body 50 and the surface to let air enter so that the sucker can be removed from the surface easily. The force applied by the user can concentrate at the proper portion of the body 50 corresponding to the drawn stem 60 because the ring-like piece 70 is open-ended and has two oppositely separate ends 72, the pulling force applied to the ring-like piece 70 is led to draw the stem 60 via the appropriate end 72 of the ring-like piece 70 to linkingly draw and raise the part of the edge 52 of the body 50, which is connected with the first end 62 of the drawn stem 60.

The case in which the user pulls the sucker in the direction indicated by "C" is the same as the condition described above, and therefore the description thereof is eliminated to avoid unnecessary repetition.

When the user pulls the ring-like piece 70 of the sucker in the direction indicated by "A", the applied force is divided and propagates to both the stems 60 to concentrate at the corresponding portions of the edge 52 of the body 50 to raise them.

In each of the cases described above, the open-ended ring-like piece 70 and the pair of separate stems can lead the force applied by the user to propagate and concentrate at the desired positions, therefore the user needs to exert only a little force to raise the edge of the body of the sucker to remove the sucker from the surface.

Furthermore, as shown is FIG. 1-3, a first joint is formed by the second end 64 and a remaining portion of one of the stems 60, the second end of each of the joints having a larger cross-sectional dimension than the remaining portion of the stem 60. Accordingly, the bearing strength of the stems 60 are enhanced.

Figure 4:
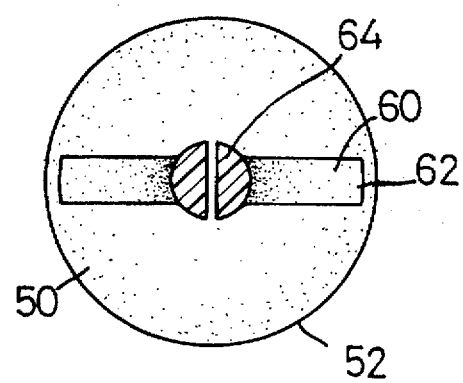
FIG. 4 is a sectional view of the sucker taken from the 4—4 line in FIG. 3.

Referring to FIG. 4, which is a sectional view of the sucker of the present embodiment taking from the 4—4 line in FIG. 3, the first end 62 of each of the stems 60 for connecting to the body 50 is as wide as the remaining portion of the stem 60.

Figure 5:
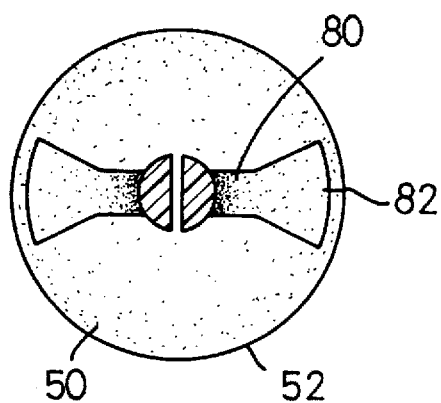
FIG. 5 is a sectional view of a sucker in accordance with another embodiment of the present invention taken from a corresponding position as the 4—4 line of FIG. 3.

However, in another embodiment, the sucker may have a different type of stems 80, each of the stems 80 has a first end 82 formed as a sector, as shown in FIG. 5. That is, the area where the first end 82 of each of the stems 80 connected to the body 50 becomes large, and therefore the sucker is easily removed from a surface.

Figure 6:
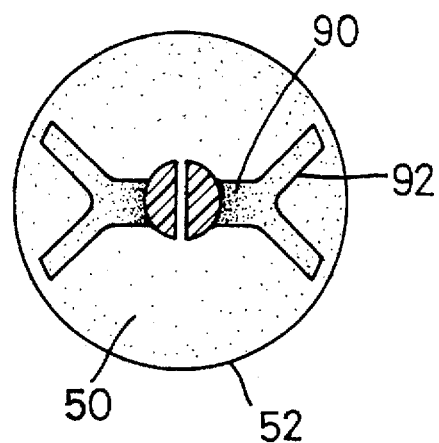
FIG. 6 is a sectional view of a sucker in accordance with a further embodiment of the present invention taken from a corresponding position as the 4—4 line of FIG. 3.
Figure 7:
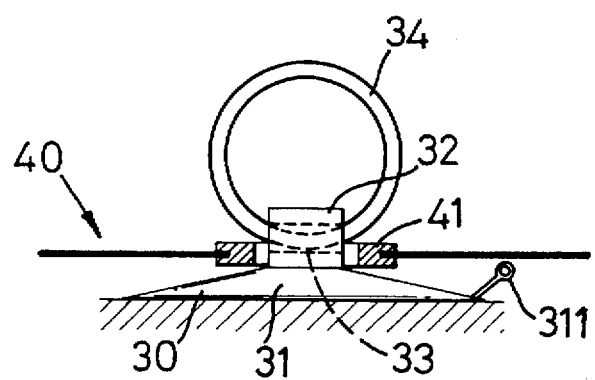
FIG. 7 shows a conventional sucker combined with a sun-shade.

Referring to FIG. 6, in a further embodiment, the sucker may have a pair of stems 90, each of the stems 90 has a first end 92 branching into a plurality of legs. Therefore, the positions where the stems 90 are connected with the body 50 are more than one, so the edge 52 of the body 50 is very easily raised from the surface to which the sucker is attached.

In the respective cases that the ends of the stems for connecting with the body being formed as a sector or branching into a plurality of legs, there is the advantage that the sucker is not easily damaged since it is very easily removed from a surface. For example, in the case that the sucker holding the sun-shade is attached to the window of a car, if the driver lowers the window and forgets to remove the sun-shade first, the sucker holding the sun-shade will be separated from the window while it contacts with an edge defining a window slot, thus, the sucker will not be damaged.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sucker structure comprising:
 a body for attaching to a surface;
 a pair of stems each having a first end connecting to said body and a second end; and
 a ring-like piece being open-ended and having two oppositely separate ends, one end of the ring-like piece being connected with the second end of one of the stems, the other end of the ring-like piece being connected with the second end of the other of the stems.

2. The sucker structure according to claim 1, wherein a first joint is formed by the second end and a remaining portion of one of the stems, and a second joint is formed by the second end and a remaining portion of the other of the stems, the second end of each of the joints having a larger cross-sectional dimensional than the corresponding remaining portion of said stem.

3. The sucker structure according to claim 1, wherein said first end of each of said stems is as wide as the corresponding remaining portion of each of said stems.

4. The sucker structure according to claim 1, wherein said first end of each of said stems is formed as a sector.

5. The sucker structure according to claim 1, wherein said first end of each of said stems branches into a plurality of legs.

6. The sucker structure according to claim 5, wherein said first end of each of said stems branches into two legs.

* * * * *